(12) United States Patent
Hanano et al.

(10) Patent No.: US 7,648,163 B2
(45) Date of Patent: Jan. 19, 2010

(54) GAS GENERATOR FOR AIR BAG

(75) Inventors: Teppei Hanano, Hyogo (JP); Naoki Matsuda, Hyogo (JP); Takashi Okuyama, Hyogo (JP)

(73) Assignee: Daicel Chemical Industries, Ltd., Osaka (JP)

( * ) Notice: Subject to any disclaimer, the term of this patent is extended or adjusted under 35 U.S.C. 154(b) by 222 days.

(21) Appl. No.: 11/199,148

(22) Filed: Aug. 9, 2005

(65) Prior Publication Data

US 2006/0088456 A1    Apr. 27, 2006

Related U.S. Application Data

(60) Provisional application No. 60/600,782, filed on Aug. 12, 2004.

(30) Foreign Application Priority Data

Aug. 10, 2004  (JP)  ............... 2004-232947
Jun. 23, 2005  (JP)  ............... 2005-183285

(51) Int. Cl.
*B60R 21/26*    (2006.01)
*B60R 21/217*    (2006.01)

(52) U.S. Cl. .............. 280/736; 280/740; 280/741; 280/742; 102/531

(58) Field of Classification Search ............. 280/736, 280/741, 742, 740; 102/531
See application file for complete search history.

(56) References Cited

U.S. PATENT DOCUMENTS

| | | | | |
|---|---|---|---|---|
| 4,902,036 A * | 2/1990 | Zander et al. | ............... | 280/736 |
| 5,087,070 A * | 2/1992 | O'Loughlin et al. | ........ | 280/740 |
| 5,100,174 A * | 3/1992 | Jasken et al. | ............... | 280/741 |
| 5,215,721 A * | 6/1993 | Tasaki et al. | ............... | 422/165 |
| 5,466,420 A * | 11/1995 | Parker et al. | ............... | 422/164 |
| 5,645,296 A * | 7/1997 | Okada et al. | ............... | 280/736 |
| 5,658,517 A * | 8/1997 | Cox et al. | ................... | 264/263 |
| 5,773,754 A * | 6/1998 | Yamato | ...................... | 149/36 |
| 6,116,643 A * | 9/2000 | Katsuda et al. | ............ | 280/741 |
| 6,156,137 A * | 12/2000 | Lundstrom et al. | ........... | 149/45 |
| 6,183,006 B1 * | 2/2001 | Katsuda et al. | ............ | 280/736 |

(Continued)

FOREIGN PATENT DOCUMENTS

JP    2-155859 A    6/1990

(Continued)

*Primary Examiner*—Paul N. Dickson
*Assistant Examiner*—Timothy Wilhelm
(74) *Attorney, Agent, or Firm*—Birch, Stewart, Kolasch & Birch, LLP

(57) ABSTRACT

The air bag gas generator comprises a housing having a gas discharge port, an ignition unit chamber in which ignition units are accommodated, and a combustion chamber in which a gas generating agent is accommodated, a cylindrical coolant/filter disposed between the combustion chamber and the gas discharge port, so that combustion gas passes through the coolant/filter prior to discharge through the gas discharge port, and the air bag gas generator meeting the following requirements (a), (b), and (c):

(a) that the gas generating agent has an amount of heat generation of 10 to 30 kcal/mol;
(b) that the mass (g) of the coolant/filter in relation to 1 mol of gas generated during combustion of the gas generating agent be 20 to 65 g/mol; and
(c) that the coolant/filter has a thickness of not less than 4.0 mm.

13 Claims, 1 Drawing Sheet

U.S. PATENT DOCUMENTS

| | | | |
|---|---|---|---|
| 6,196,581 B1 * | 3/2001 | Katsuda et al. | 280/736 |
| 6,224,096 B1 * | 5/2001 | Katsuda et al. | 280/736 |
| 6,234,521 B1 * | 5/2001 | Katsuda et al. | 280/736 |
| 6,386,582 B2 * | 5/2002 | Katsuda et al. | 280/736 |
| 6,409,214 B2 * | 6/2002 | Katsuda et al. | 280/741 |
| 6,460,884 B1 * | 10/2002 | Nakashima et al. | 280/741 |
| 6,543,805 B2 * | 4/2003 | McFarland et al. | 280/736 |
| 6,695,345 B2 * | 2/2004 | Katsuda et al. | 280/736 |
| 6,808,204 B1 * | 10/2004 | Katsuda et al. | 280/741 |
| 6,854,395 B2 * | 2/2005 | Katsuda et al. | 102/530 |
| 6,926,304 B2 * | 8/2005 | Miyaji et al. | 280/741 |
| 6,942,249 B2 * | 9/2005 | Iwai et al. | 280/741 |
| 7,040,657 B2 * | 5/2006 | Iwai et al. | 280/741 |
| 7,044,501 B2 * | 5/2006 | Yamazaki | 280/737 |
| 7,172,214 B2 * | 2/2007 | Matsuda et al. | 280/741 |
| 2002/0017778 A1 * | 2/2002 | Katsuda et al. | 280/741 |
| 2003/0042718 A1 * | 3/2003 | Katsuda et al. | 280/736 |
| 2003/0222443 A1 * | 12/2003 | Cheal et al. | 280/741 |
| 2004/0203373 A1 | 10/2004 | Ogino et al. | |
| 2004/0207188 A1 * | 10/2004 | Matsuda et al. | 280/741 |

FOREIGN PATENT DOCUMENTS

| | | |
|---|---|---|
| JP | 4-65384 A | 3/1992 |
| JP | 5-285578 A | 11/1993 |
| JP | 2001-171473 A | 6/2001 |
| JP | 2004-203373 A | 7/2004 |
| WO | WO-96/10495 A1 | 4/1996 |

* cited by examiner

GAS GENERATOR FOR AIR BAG

CROSS-REFERENCE TO RELATED APPLICATIONS

This Nonprovisional application claims priority under 35 U.S.C. §119(e) on U.S. Provisional Application No. 60/600,782 filed on Aug. 12, 2004 and under 35 U.S.C. §119(a) on Patent Application No. 2004-232947 filed in Japan on Aug. 10, 2004 and Patent Application No. 2005-183285 filed in Japan on Jun. 23, 2005, the entire contents of which are hereby incorporated by reference.

BACKGROUND OF THE INVENTION

1. Field of the Invention

The present invention relates to a gas generator for an air bag which protects passengers from an impact.

2. Description of the Related Art

From the viewpoint of passenger protection, various demands have been made in relation to air bag gas generators which are incorporated into an air bag system installed in an automobile. One of these demands is a reduction in size and weight of the air bag gas generator itself in accordance with demands for a reduction in the weight of the vehicle.

A gas generator accommodates therein a coolant/filter for cooling high-temperature combustion gas that is generated upon combustion of a gas generating agent, and trapping combustion residues. However, this coolant/filter is a high-density device formed from a wire mesh or the like, and therefore has a large mass. Accordingly, demands are being made for a smaller, lighter coolant/filter which enables reductions in the size and weight of the gas generator while maintaining a favorable cooling effect and so on.

As prior art of the present invention, U.S. Pat. No. 6,543,805 and U.S. Pat. No. 5,466,420 can be cited.

SUMMARY OF THE INVENTION

An object of the present invention is to provide a gas generator for an air bag which can be reduced in overall weight by reducing the size and weight of a coolant/filter while maintaining the filtration and cooling functions of the coolant/filter.

The gas generator for an air bag according to the present invention may be applied to a single stage gas generator having single ignition means and a single combustion chamber, or a dual stage gas generator having two ignition means and two combustion chambers.

As means for achieving this object, the present invention provides a gas generator for an air bag comprising a housing having a gas discharge port, an ignition means chamber in which ignition means are accommodated, and a combustion chamber in which a gas generating agent is accommodated, a cylindrical coolant/filter disposed between the combustion chamber and the gas discharge port so that combustion gas passes through the coolant/filter prior to discharge through the gas discharge port, and the gas generator meeting the following requirements (a), (b), and (c):

(a) that the gas generating agent has an amount of heat generation of 10 to 30 kcal/mol;

(b) that the mass (g) of the coolant/filter in relation to 1 mol of gas generated during combustion of the gas generating agent be 20 to 65 g/mol; and (c) that the coolant/filter has a thickness of not less than 4.0 mm.

By setting the amount of heat generation of the gas generating agent serving as the air bag inflating medium within a predetermined range indicated by the requirement (a), associating this with the mass of the coolant/filter indicated by the requirement (b), and setting the thickness of the coolant/filter within a predetermined range indicated by the requirement (c), the size and weight of the gas generator can be reduced while maintaining functions of the coolant/filter (i.e. a combustion gas filtration function and a combustion gas cooling function). Note that in the following, when a gas generating agent is used as a transfer charge, the gas generating agent of the requirements (a) and (b) denotes both the gas generating agent accommodated in the combustion chamber and the gas generating agent used as the transfer charge.

There are no particular limitations on the composition (components and proportions) of the gas generating agent as long as the requirement (a) is met. Note, however, that when gas generating agents (the gas generating agent 1 and gas generating agent 2 in the following formula) having different compositions (components and proportions) and the like are charged respectively into the two combustion chambers of a dual stage gas generator, the amount of heat generation of the requirement (a) is the average molar heat amount of the two components determined from the formula (I), and denotes the amount of heat generation per mole of gas generated during combustion of the gas generating agent.

$$(Q_1 M_1 + Q_2 M_2)/(M_1 + M_2) \qquad (I)$$

$M_1$: number of moles of gas generated when gas generating agent 1 burns entirely, $Q_1$: amount of heat generation per mole of generated gas during combustion of gas generating agent 1, $M_2$: number of moles of gas generated when gas generating agent 2 burns entirely, and $Q_2$: amount of heat generation per mole of generated gas during combustion of gas generating agent 2.

Further, when gas generating agents (the gas generating agent 1 and gas generating agent 2 in the following formula) having different compositions (components and proportions) and the like are charged respectively into the two combustion chambers of a dual stage gas generator, and gas generating agents are used as the transfer charges, the amount of heat generation of the requirement (a) is the average molar heat amount of the two components determined from the formula (II), and denotes the amount of heat generation per mole of gas generated during combustion of the gas generating agent.

$$(Q_1 M_1 + Q_A M_A) + (Q_2 M_2 + Q_B M_B)/(M_1 + M_A + M_2 + M_B) \qquad (II)$$

$M_1$: number of moles of gas generated when gas generating agent 1 burns entirely, $Q_1$: amount of heat generation per mole of generated gas during combustion of gas generating agent 1, $Q_A$: number of moles of gas generated when gas generating agent A (transfer charge) burns entirely, $M_A$: amount of heat generation per mole of generated gas during combustion of gas generating agent A (transfer charge), $M_2$: number of moles of gas generated when gas generating agent 2 burns entirely, $Q_2$: amount of heat generation per mole of generated gas during combustion of gas generating agent 2, $Q_B$: number of moles of gas generated when gas generating agent B (transfer charge) burns entirely, and $M_B$: amount of heat generation per mole of generated gas during combustion of gas generating agent B (transfer charge).

The gas generating agent preferably takes the form of a molded article (excluding powder), and may be formed in a columnar form, a columnar form having at least one hole (the holes may be through holes or non-through holes), or a disk form (which may have at least one through or non-through hole), for example.

In the case of a dual stage gas generator having two combustion chambers, the composition and form of the respective gas generating agents may be the same or different.

In the gas generator for an air bag according to the present invention, a ratio between $H_1$ and $H_2$ ($H_2/H_1$), where $H_1$ is a height from a ceiling surface to a base surface of the housing and $H_2$ is a height of the cylindrical coolant/filter, is within a range of 0.45 to 0.80.

By meeting the requirements (a) to (c) as described above, the functions of the coolant/filter are maintained, and by setting the above height ratio within the above range, the coolant/filter can be reduced in size and weight.

In the gas generator for an air bag according to the present invention, the ignition means comprises an electric igniter that is activated by an ignition current, and a transfer charge that is ignited upon activation of the electric igniter, a gas generating agent having a combustion temperature of 1700 to 3000° C. is used as the transfer charge, and a gas generating agent having a combustion temperature of 1000 to 1700° C. is used as the gas generating agent accommodated in the combustion chamber.

A gas generating agent having a composition using nitroguanidine as a fuel and strontium nitrate as an oxidant may be cited as an example of a gas generating agent having a combustion temperature of 1700 to 3000° C. (corresponding to the gas generating agent A in the formula (II)). This gas generating agent has good ignitability, and can be ignited and burned directly by an igniter containing known ZPP (zirconium and potassium perchlorate, typically between 90 g and 300 g). In this case, the time required for complete combustion of the gas generating agent A can be adjusted by forming the gas generating agent A in a cylindrical form having a single or a plurality of through holes, a cylindrical form having a single or a plurality of non-through holes, or a columnar pellet form.

A gas generating agent having a composition using guanidine nitrate as a fuel and basic copper oxide as an oxidant, for example, may be cited as a gas generating agent having a combustion temperature of 1000 to 1700° C. (corresponding to the gas generating agent 1 in the formula (II)). The gas generating agent 1 has poorer ignitability than the gas generating agent A, and it is difficult to ignite and burn the gas generating agent 1 directly using only an igniter containing known ZPP. However, since the combustion temperature of the gas generating agent 1 is low, the load on the coolant/filter is lightened. Hence, the coolant/filter can be simplified, and the overall size of the gas generator can be reduced. The poor ignitability of the gas generating agent 1 can be solved by combining the gas generating agent 1 with the gas generating agent A having a combustion temperature of 1700 to 3000° C.

Further, when a dual stage gas generator is used, a well-known transfer charge such as ZPP may be used as the transfer charge in one of the ignition means.

In the present invention, the amount of heat generation of the gas generating agent (the gas generating agent accommodated in the combustion chamber, not the gas generating agent used as the transfer charge) is set within the predetermined range indicated by the requirement (a), but in this case, the ignitability may deteriorate slightly. Hence, a combination of the gas generating agent A and the gas generating agent 1 described above may be employed as means for maintaining favorable ignitability in this case.

As other means for achieving the object, the present invention provides a gas generator for an air bag comprising a housing having a gas discharge port, an ignition means chamber in which ignition means are accommodated, and a combustion chamber in which a gas generating agent is accommodated, a cylindrical coolant/filter disposed between the combustion chamber and the gas discharge port, so that combustion gas passes through the coolant/filter prior to discharge through the gas discharge port, the ignition means chamber formed by an interior space of an inner cylinder disposed in a central portion of the housing, and the ignition means chamber communicating with the combustion chamber via a communication hole provided in a peripheral wall of the inner cylinder, and the cylindrical coolant/filter supported by a substantially cylindrical retainer fitted into the housing, and the gas generator meeting the following requirements (a) through (d):

(a) that the gas generating agent have an amount of heat generation of 10 to 30 kcal/mol;

(b) that the mass (g) of the coolant/filter in relation to 1 mol of gas generated during combustion of the gas generating agent be 20 to 65 g/mol;

(c) that the coolant/filter have a thickness of no less than 4.0 mm; and (d) that a ratio between $H_1$ and $H_2$ ($H_2/H_1$), where $H_1$ is a height from a ceiling surface to a base surface of the housing and $H_2$ is a height of the cylindrical coolant/filter, be within a range of 0.45 to 0.80.

By meeting the requirements (a) to (c) as described above, the functions of the coolant/filter (i.e. a combustion gas filtration function and a combustion gas cooling function) are maintained, and by reducing the height as indicated in the requirement (d), the coolant/filter can be reduced in size and weight, and hence the overall weight of the gas generator can be reduced.

Note that the retainer serves not only to support the coolant/filter, but also to lead the combustion gas to the coolant/filter. When the requirement (d) is met, the coolant/filter is disposed to block (in such a manner that air may still pass through) a part of the entire height (H) of the housing. Hence, the retainer is provided with the further aims of preventing the combustion gas from reaching the gas discharge port without passing through the coolant/filter, and ensuring that the combustion gas is discharged through the gas discharge port after passing through the coolant/filter.

In the gas generator for an air bag according to the present invention, the gas discharge port provided in the housing and at least a part of the communication hole provided in the peripheral wall of the inner cylinder to communicate the ignition means chamber with the combustion chamber are provided in mutually opposing height positions in the radial direction, and such that a peripheral wall of the substantially cylindrical retainer exists between the mutually opposing gas discharge port and at least a part of the communication hole.

When combustion gas is emitted from the combustion chamber inside the inner cylinder, the thermal energy thereof advances directly, and therefore when the retainer is not provided, this thermal energy impinges in concentrated fashion on a part of the coolant/filter. If the thermal energy impinges on a part of the coolant/filter in concentrated fashion, only a part of the coolant/filter exhibits the filtration and cooling functions, and hence it may be impossible to exhibit filtration and cooling functions sufficiently.

When the peripheral wall of the retainer exists in the advancement direction of the thermal energy, the thermal energy impinges on the peripheral wall of the retainer, and then flows into the coolant/filter. As a result, filtration and cooling are performed by the entire coolant/filter, and the filtration and cooling functions can be exhibited sufficiently.

In the gas generator for an air bag according to the present invention, the coolant/filter, which is a particularly heavy component, is reduced in size, enabling a reduction in the overall weight of the gas generator. By reducing the size of the coolant/filter, manufacturing costs can also be reduced.

DETAILED DESCRIPTION OF THE INVENTION

Figure 1:
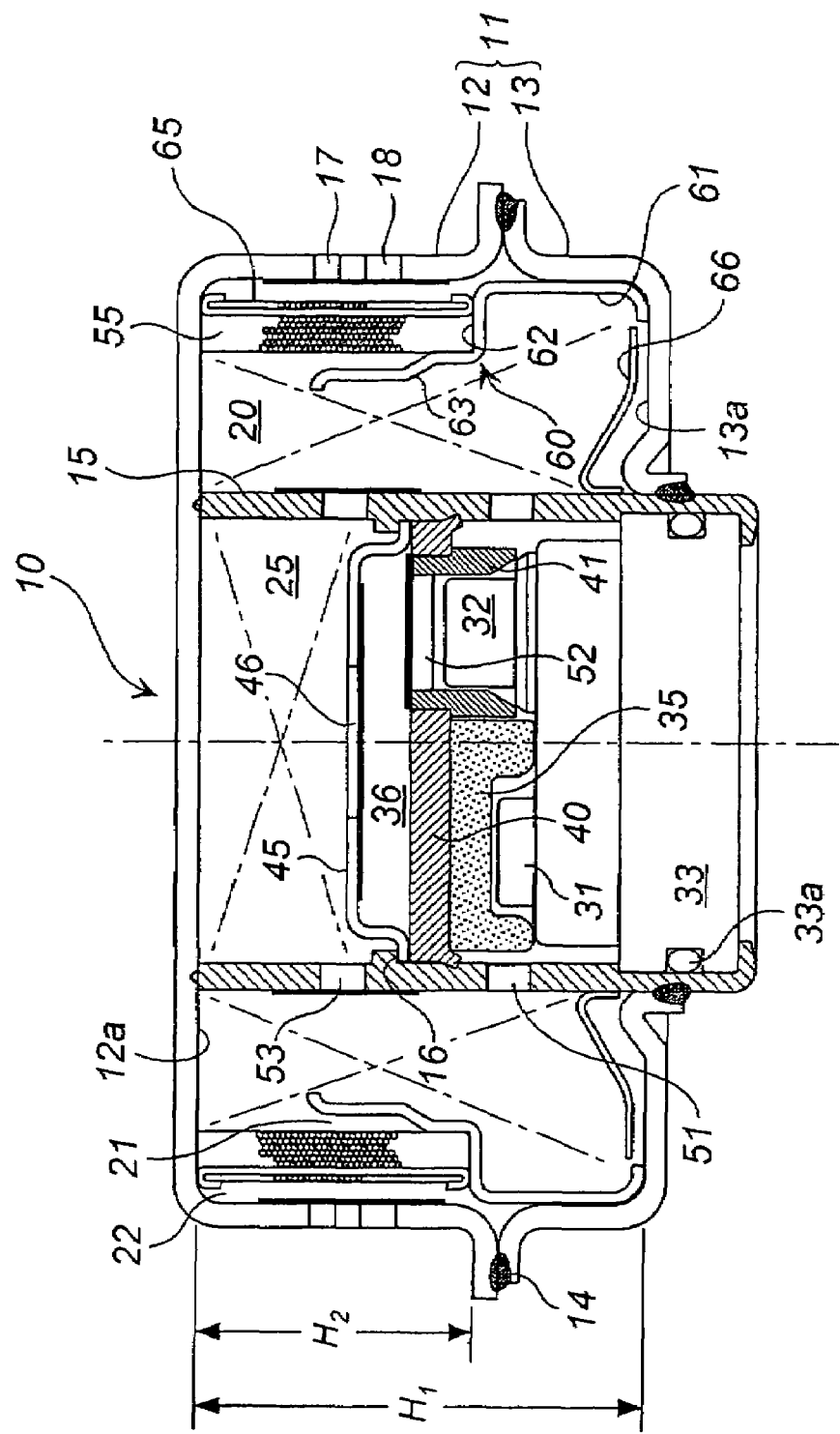
FIG. 1 is a sectional view of a gas generator for an air bag in the axial direction thereof.

An embodiment of the present invention will be described by referring to FIG. 1. FIG. 1 is a schematic sectional view of a gas generator for an air bag in the axial direction thereof. Here, the "axial direction" signifies the axial direction of a housing. When the term "radial direction" is used, this signifies the radial direction of the housing.

The outer shell container of a gas generator 10 comprises a housing 11 formed by joining a diffuser shell 12 and a closure shell 13 which forms an internal storage space together with the diffuser shell 12. The diffuser shell 12 and the closure shell 13 are welded at a welded portion 14. The other black-shaded parts in FIG. 1 indicate other welded portions.

Gas discharge ports 17, 18 are provided in the diffuser shell 12 in a required number, and these gas discharge ports 17, 18 are sealed from the inside by a sealing tape made of stainless steel or the like. The gas discharge ports 17 and 18 may have identical or different diameters.

An inner cylinder 15 having a substantially cylindrical form is disposed inside the housing 11. The upper end peripheral edge of the inner cylinder 15 is joined to a ceiling surface 12a of the diffuser shell 12 by welding, and the lower end peripheral edge thereof is joined to a base surface 13a of the closure shell 13 by welding, thereby partitioning the housing 11.

An annular first combustion chamber 20 is provided in the outside space of the inner cylinder 15, and a molded article of a first gas generating agent (having a combustion temperature between 1700 and 3000° C.), not shown in the drawing, is accommodated in the annular first combustion chamber 20. The molded article of the first gas generating agent is charged densely enough into the interior of the first combustion chamber 20 to be immobile. A charge-regulating retainer 66 is provided to adjust the volume of the first combustion chamber 20 in accordance with the charging amount of the molded article of the first gas generating agent.

A second combustion chamber 25 is provided in an upper space of the inner cylinder 15, and a molded article of a second gas generating agent (having a combustion temperature between 1000 and 1700° C.), not shown in the drawing, is accommodated in the second combustion chamber 25.

The first combustion chamber 20 and second combustion chamber 25 communicate via a third through hole 53 provided in the inner cylinder 15. The third through hole 53 is sealed from the first combustion chamber side by sealing tape (made of aluminum, stainless steel, or similar).

A first ignition means chamber and a second ignition means chamber, each accommodating a single ignition means, are provided in a lower space of the inner cylinder 15.

A first electric igniter 31 and a first transfer charge 35 are provided in the first ignition means chamber, while a second electric igniter 32 and second transfer charge are provided in the second ignition means chamber. The first igniter 31 and second igniter 32 are fixed to a single collar 33 (in which an O-ring 33a for moisture-proof is disposed) and arranged in parallel in the radial direction. Note that when an air bag module including the gas generator 10 is mounted in a vehicle, the first igniter 31 and second igniter 32 are connected to a power source (battery) via a connector and lead wire.

The upper and lower spaces of the inner cylinder 15 are partitioned by a plate-form partition wall 40 having a skirt portion 41 and a second through hole 52. In other words, the plate-form partition wall 40 partitions the second combustion chamber 25 from the first and second igniters 31, 32. As a result, ignition energy (a flame, combustion gas, etc.) generated upon activation of the first igniter 31 is prevented from entering the second ignition means chamber and passing through the second through hole 52 into the second combustion chamber 25.

The plate-form partition wall 40 is fitted into a stepped notch portion 16 of the inner cylinder 15 from the lower side, together with a flange portion of an aluminum cup 45 for charging the second transfer charge. Thus the plate-form partition wall 40 is prevented from being moved upward by the pressure generated upon activation of the first igniter 31.

The inner diameter of the skirt portion 41 is set to be substantially identical to the diameter of the ignition part of the igniter 32. The skirt portion 41 surrounds the ignition part tightly, and hence the flame that is generated upon activation of the second igniter 32 advances only in the direction of the second through hole 52. The second through hole 52 is sealed from the upper side by sealing tape made of aluminum or the like.

The first transfer charge 35 charged into the aluminum cup is disposed directly above the first igniter 31. The first transfer charge 35 comprises ZPP powder.

A first through hole 51 provided in a lower portion of the side wall of the inner cylinder 15 makes the first combustion chamber 20 communicate with first ignition means chamber, and is provided in a position facing the first transfer charge 35. By disposing the first through hole 51 and first transfer charge 35 in mutually opposing positions, all of the first transfer charge 35 is burned substantially evenly upon activation of the first igniter 31.

Moreover, the first through hole 51 is provided in the lower portion of the inner cylinder 15, and therefore the ignition energy produced by combustion of the first transfer charge 35, which is released in the radial direction initially, switches its orientation to flow upward, thereby enhancing the ignitability of all of the first gas generating agent accommodated in the first combustion chamber 20.

A second transfer charge is disposed on the plate-form partition wall 40 above the second igniter 32. The second transfer charge is charged into a second transfer charge chamber 36 surrounded by the aluminum cup 45, which is provided with a flame-transferring hole 46. A molded article of a gas generating agent having a combustion temperature of 1700 to 3000° C. is used as the second transfer charge. The flame-transferring hole 46 is sealed from the inside by sealing tape made of aluminum or the like.

Examples of a gas generating agent having a combustion temperature of 1700 to 3000° C., which may be used as the second transfer charge, include an agent comprising 45 to 55 percent nitroguanidine by mass, 35 to 45 percent strontium nitrate by mass, and 3 to 20 percent aluminum hydroxide by mass, or an agent comprising 40 to 50 percent nitroguanidine by mass, 40 to 50 percent basic copper nitrate by mass, and 3 to 20 percent aluminum hydroxide by mass.

A cylindrical coolant/filter 55 is provided in the interior of the first combustion chamber 20. The lower end surface and the lower portion of the inner peripheral surface of the coolant/filter 55 are supported by a substantially cylindrical retainer 60 fitted into the housing 11, and the upper end surface of the coolant/filter 55 is supported by the ceiling surface 12a of the diffuser shell.

The coolant/filter 55 may be formed from a laminated body of wire mesh, or by weaving metal wires such as stainless steel, iron, or iron plated with copper or the like using a weaving method such as knitting, winding, plain weave, twilled weave, plain Dutch weave, or twilled Dutch weave, or by winding metal wire around a core, or by another method.

The retainer 60 is inserted such that the outer peripheral surface of a lower portion peripheral wall 61 thereof abuts against the inner peripheral wall of the closure shell 13. The lower portion peripheral wall 61 directly opposes the first through hole 51, and therefore the ignition energy emitted through the first through hole 51 (energy for igniting and burning the first gas generating agent) impinges on the lower portion peripheral wall 61.

The retainer 60 comprises an annular plane 62 near the central portion thereof in the height direction, and this plane supports the lower end surface of the coolant/filter 55.

An upper portion peripheral wall 63 of the retainer 60 extends further upward from the annular plane 62, but only the lower side of the upper portion peripheral wall 63 contacts the inner peripheral surface of the coolant/filter 55, while the upper side is inclined in the direction of the inner cylinder 15. Hence a gap (first gap) 21 is provided between the upper side of the upper portion peripheral wall 63 and the inner peripheral surface of the coolant/filter 55.

The upper portion peripheral wall 63 directly opposes the gas discharge ports 17, 18 and the third through hole 53 provided in the peripheral wall of the inner cylinder 15. Thus, the high-temperature gas emitted through the third through hole 53 impinges on the upper portion peripheral wall 63 of the retainer 60, and then flows into the coolant/filter 55. Since the first gap 21 is provided, the high-temperature gas passes through substantially the entire coolant/filter 55 at this time.

A cylindrical expansion preventing member 65 is provided on the outer peripheral surface of the cylindrical coolant/filter 55 so as to be fitted between the annular plane 62 of the retainer 60 and the ceiling face 12a of the diffuser shell 12. The expansion preventing member 65 comprises wire mesh or the like having favorable gas permeability and high pressure resistance. The expansion preventing member 65 receives the pressure generated by combustion of the gas generating agent, and thereby prevents the coolant/filter 55 from expanding and deforming. If the coolant/filter 55 expands and deforms, a gap is created between the ceiling face 12a and the upper end surface of the coolant/filter 55. As a result, the high-temperature gas may be discharged through the gas discharge ports 17, 18 via this gap rather than the coolant/filter 55, producing a short pass phenomenon. The expansion preventing member 65 is provided to prevent such a situation.

A second gap 22 is provided between the expansion preventing member 65 and the gas discharge ports 17, 18. The second gap 22 acts together with the first gap 21 to ensure that the high-temperature gas passes through the entire coolant/filter 55.

The air bag gas generator shown in FIG. 1 meets the following requirements (a) to (c), and preferably meets the following requirements (a) to (d).

Requirement (a)

The gas generating agent produces an amount of heat generation of 10 to 30 kcal/mol, preferably 14 to 29 kcal/mol, more preferably 18 to 28 kcal/mol, and even more preferably 22 to 26 kcal/mol.

To achieve the amount of heat generation range described above, a combination of a fuel, an oxidant, and where necessary an additive and a binder, may be used as the gas generating agent. A preferred example of such a gas generating agent comprises 35 to 50 percent guanidine nitrate by mass, 40 to 55 percent basic copper nitrate by mass, 1 to 10 percent aluminum hydroxide by mass, and 1 to 10 percent sodium carboxy methyl cellulose by mass.

There are no particular limitations on the form of the gas generating agent, and any known form, for example a columnar form, a columnar form having one or a plurality of through holes or non-through holes, a disk form, and so on may be used. Note, however, that powder form is undesirable.

Requirement (b)

The mass (g) of the coolant/filter in relation to 1 mol of gas generated during combustion of the gas generating agent is 20 to 65 g/mol, preferably 25 to 60 g/mol, and more preferably 30 to 50 g/mol.

By setting the requirement (b) within the above range, the mass of the coolant/filter is associated with the amount of heat generation of the gas generating agent according to the requirement (a).

Requirement (c)

The thickness of the coolant/filter should be not less than 4.0 mm, preferably between 4.0 and 16 mm, and more preferably between 4.5 and 7.0 mm.

By setting the requirement (c) within the above range, the thickness and mass of the coolant/filter are associated with the amount of heat generation of the gas generating agent according to the requirement (a).

By meeting the requirements (a), (b), and (c), the coolant/filter can be reduced in size and weight while maintaining its functions (i.e., a combustion gas filtration function and a combustion gas cooling function).

As a result, a ratio between $H_1$ and $H_2$ ($H_2/H_1$), where $H_1$ is the height from the ceiling surface to the base surface of the housing and $H_2$ is the height of the cylindrical coolant/filter, can be set within the range of 0.45 to 0.80 as a requirement (d). $H_2/H_1$ is preferably between 0.45 and 0.7, and more preferably between 0.5 and 0.6. $H_1$ denotes the interval from the ceiling surface 12a to the base surface 13a, and $H_2$ denotes the length of the coolant/filter 55 from the upper end surface to the lower end surface.

Note that the retainer 60 is preferably provided as a prerequisite for meeting the requirement (d), but the coolant/filter 55 may be supported by other means.

Next, an operation of the air bag gas generator 10 will be described using FIG. 1. The air bag gas generator 10 is a dual stage gas generator having two igniters, and hence may be activated according to three patterns: (1) the two igniters are activated at a time difference; (2) the two igniters are activated simultaneously; and (3) only the first igniter 31 is activated (note however, that in this case, the second igniter 32 is also activated at a delay of approximately 100 milliseconds to ensure operational safety when dismantling the gas generator). In the following description, however, an operation in which the two igniters are activated at a time difference will be described.

Upon activation of the first igniter 31, the first transfer charge 35 is ignited and burned, and the ignition energy (flame and high-temperature gas) generated thereby flows through the first through hole 51 into the first combustion chamber 20. As a result, the first gas generating agent is ignited and burned, generating high-temperature gas.

The high-temperature gas passes through the entire coolant/filter 55 due to the action of the first gap 21 and second gap 22, and is filtered and cooled as a result. The gas then breaks the sealing tape and is thus discharged through the gas discharge ports 17, 18 to inflate the air bag.

The ignition energy generated upon the subsequent activation of the second igniter 32 breaks the sealing tape and passes through the second through hole 52 into the second transfer charge chamber 36. As a result, the second transfer charge is ignited and burned, generating high-temperature gas. The high-temperature gas breaks the sealing tape and flows through the flame-transferring hole 46 into the second combustion chamber 25, and thus the second gas generating agent is ignited and burned, generating high-temperature gas.

The high-temperature gas breaks the sealing tape to flow through the third through hole 53 into the first combustion chamber 20, passes through the coolant/filter 55, and is then discharged through the gas discharge ports 17, 18 to further inflate the air bag.

The air bag gas generator of the present invention may be applied as a gas generator for various known air bag types such as ones for a driver side and for a front passenger side.

EXAMPLES

The following values of the heat of the combustion of the gas generating agent and the combustion temperature of the gas generating agent and transfer charge were calculated by theoretical calculations.

Examples 1, 2 and Comparative Example 1

The gas generator for an air bag shown in FIG. 1 was assembled. The details of each portion are as follows. The gas generating agent and transfer charge shown in Table 1 were used.

Housing height (length from outer surface of diffuser shell 12 to outer surface of closure shell 13): 36.5 cm.

Housing diameter (length from gas discharge port on one end side to gas discharge port on the other end side): 70 cm.

Coolant/filter: cylindrical form manufactured by winding stainless steel wire, mass 55 g, thickness 5.2 mm.

TABLE 1

|  | Example 1 | Example 2 | Comparative Example 1 |
| --- | --- | --- | --- |
| First Gas Generating Agent | GB type (36 g) | GB type (36 g) | NQ2 type (37 g) |
| First Transfer Charge | NQ1 type (3.5 g) | NQ1 type (3.5 g) | — |
| Second Gas Generating Agent | GB type (8 g) | NQ1 type (8 g) | NQ2 type (5.5 g) |
| Second Transfer Charge | NQ1 type (2 g) | — | — |
| Requirement (a) (kcal/mol) | 23 | 25 | 36 |
| Requirement (b) (g/mol) | 41 | 43 | 139 |
| Requirement (c) (mm) | 5.8 | 5.8 | 5.8 |
| Requirement (d) ($H_2/H_1$) | 0.58 | 0.58 | 1 |
| Internal Tank pressure (kPa) from 60 L Tank Combustion Test | 200 | 210 | 200 |
| Temperature of Discharged Gas (□) | 790 | 820 | 940 |
| Metal Component Trapping Rate (%) | 95 | 94 | 90 |

GN: guanidine nitrate, NQ: nitroguanidine, BCN: basic copper nitrate
CMCNa: sodium carboxy methyl cellulose
GB type: GN/BCN/Al(OH)$_3$/CMCNa = 41/49/5/5(mass %)
NQ1 type: NQ/Sr(NO$_3$)$_2$/Clay/CMCNa = 34/55/1/10(mass %)
NQ2 type: NQ/Sr(NO$_3$)$_2$/Clay/CMCNa = 32/52/7/9(mass %)

Metal component trapping rate: determined from (mass of trapped metal (g)×100)/total metal mass in raw material (g).

Equation generated from formula (II) of requirement (a) in Example 1:

$$(22\times1.00+36\times0.08)+(22\times0.22+36\times0.05)/1.00+0.08+0.22+0.05=23\text{(kcal/mol)}$$

In this equation, each numerator corresponds to the following numerical values (amount of heat generation×number of generated gas moles), and the denominator is the total number of generated gas moles.

First transfer charge ($Q_A M_A$): 22 (kcal/mol)×1.00 (mol)
First gas generating agent ($Q_1 M_1$): 36 (kcal/mol)×0.08 (mol)
Second transfer charge ($Q_B M_B$): 22 (kcal/mol)×0.22 (mol)
Second gas generating agent ($Q_2 M_2$): 36 (kcal/mol)×0.05 (mol)

Equation generated from formula (II) of requirement (a) in Example 2:

$$22\times1.00+36\times0.08+36\times0.20/1.00+0.08+0.20=25\text{(kcal/mol)}$$

In this equation, each numerator corresponds to the following numerical values (amount of heat generation×number of generated gas moles), and the denominator is the total number of generated gas moles.

First transfer charge ($Q_A M_A$): 22 (kcal/mol)×1.00 (mol)
First gas generating agent ($Q_1 M_1$): 36 (kcal/mol)×0.08 (mol)
Second transfer charge: –
Second gas generating agent ($Q_2 M_2$): 36 (kcal/mol)×0.20 (mol)

It was confirmed from the results in Table 1 that the air bag gas generator according to the present invention possesses good filtration and cooling functions despite the coolant/filter being reduced in size and weight.

The invention claimed is:

1. A gas generator for an air bag, comprising:
    a housing having a gas discharge port;
    an inner cylinder provided inside the housing and defining therein an ignition means chamber, in which ignition means are accommodated, and a combustion chamber, in which a gas generating agent is accommodated, and separated from the ignition means chamber, the inner cylinder being provided with a first through hole that allows only the ignition means chamber to communicate with a chamber outside the inner cylinder, and a second through hole that allows only the combustion chamber to communicate with the chamber outside the inner cylinder;

a cylindrical coolant/filter disposed within the chamber outside the inner cylinder, and between the combustion chamber and the gas discharge port so that combustion gas passes through the coolant/filter prior to discharge through the gas discharge port, a retainer including a lower peripheral wall, an upper peripheral wall, and an annular plane connecting the lower peripheral wall and the upper peripheral wall, the retainer being provided such that, the lower peripheral wall opposes the first through hole and makes a direct contact with an inner circumferential wall extending between a ceiling surface and a base surface of the housing, the annular plane supporting a lower end surface of the cylindrical coolant/filter, and the upper peripheral wall opposes the second through hole and the gas discharge port, wherein a first gap is defined between the cylindrical coolant/filter and the upper peripheral wall, and a second gap is defined between the cylindrical coolant/filter and the inner circumferential wall of the housing, the first gap and the second gap are provided between the upper peripheral wall and the gas discharge port.

2. The gas generator for an air bag according to claim 1, wherein a ratio between H1 and H2 (H2/H1), where H1 is a height from a ceiling surface to a base surface of the housing and H2 is a height of the cylindrical coolant/filter, is within a range of 0.45 to 0.80.

3. The gas generator for an air bag according to claim 1, wherein a ratio between H1 and H2 (H2/H1), where H1 is a height from a ceiling surface to a base surface of the housing and H2 is a height of the cylindrical coolant/filter, is within a range of 0.45 to 0.80.

4. The gas generator for an air bag according to claim 1, wherein the ignition means includes an electric igniter activated by an ignition current, and a transfer charge ignited upon activation of the electric igniter, wherein the transfer charge is a gas generating material having a combustion temperature of 1700 to 3000° C., and the gas generating agent has a combustion temperature of 1000 to 1700° C.

5. The gas generator for an air bag according to claim 4, wherein the gas generating agent is provided within the combustion chamber.

6. The gas generator for an air bag according to claim 1, wherein the retainer is provided within the combustion chamber such that a lower portion of the upper peripheral wall contacts an inner peripheral surface of the cylindrical coolant/filter and the first gap is provided between an upper portion of the upper peripheral wall and the inner peripheral surface of the cylindrical coolant/filter.

7. The gas generator for an air bag according to claim 1, wherein an upper end of the upper peripheral wall is bent in a direction of the inner cylinder.

8. The gas generator for and air bag according to claim 1, wherein the gas discharge port and the second through hole are provided mutually opposing height position in a radial direction, and the retainer is provided within the chamber outside the inner cylinder such that the upper peripheral wall extends between the gas discharge port and the second through hole.

9. The gas generator for an air bag according to claim 1, wherein the chamber outside the inner cylinder is provided with a gas generating agent and the gas generator meets the following requirements (a) and (b):
  (a) the gas generating agent has an amount of heat generation of 10 to 30 kcal/mol; and
  (b) the mass (g) of the coolant/filter in relation to 1 mol of gas generated during combustion of the gas generating agent be 20 to 65 g/mol.

10. The gas generator for an air bag according to claim 1, wherein the retainer includes, in the lower peripheral wall, an inward flange bent in a direction of the inner cylinder and such that the lower peripheral wall and the inward flange are in direct contact with the circumferential wall surface and the base surface of the housing, respectively.

11. The gas generator for an air bag according to claim 1, wherein a diameter of the upper peripheral wall is smaller than a diameter of the lower peripheral wall.

12. The gas generator for an air bag according to claim 1, wherein the cylindrical coolant/filter is provided, such that an upper end surface of the cylindrical filter/coolant is in contact with a ceiling surface of the housing and the lower end surface of the cylindrical filter/coolant is supported by the annular plane of the retainer.

13. The gas generator for an air bag according to claim 1, wherein the cylindrical coolant/filter has a thickness of not less than 4.0 mm.

* * * * *